US011599482B2

(12) United States Patent
Yeung et al.

(10) Patent No.: US 11,599,482 B2
(45) Date of Patent: Mar. 7, 2023

(54) SYSTEMS, METHODS AND APPARATUS FOR A STORAGE CONTROLLER WITH MULTI-MODE PCIE FUNCTIONALITIES

(71) Applicant: SUZHOU KUHAN INFORMATION TECHNOLOGIES CO., LTD., Jiangsu (CN)

(72) Inventors: Kwok Wah Yeung, Suzhou (CN); Ka Wing Cheung, Suzhou (CN); David Crespi, Suzhou (CN)

(73) Assignee: Suzhou Kuhan Information Technologies Co., Ltd., Suzhou (CN)

( * ) Notice: Subject to any disclaimer, the term of this patent is extended or adjusted under 35 U.S.C. 154(b) by 19 days.

(21) Appl. No.: 17/278,270

(22) PCT Filed: Sep. 20, 2019

(86) PCT No.: PCT/CN2019/107015
§ 371 (c)(1),
(2) Date: Mar. 19, 2021

(87) PCT Pub. No.: WO2020/057638
PCT Pub. Date: Mar. 26, 2020

(65) Prior Publication Data
US 2021/0334226 A1    Oct. 28, 2021

(30) Foreign Application Priority Data
Sep. 21, 2018  (CN) .......................... 201811108121.2

(51) Int. Cl.
*G06F 13/16*   (2006.01)
*G06F 13/42*   (2006.01)
(52) U.S. Cl.
CPC ...... *G06F 13/1668* (2013.01); *G06F 13/4282* (2013.01); *G06F 2213/0026* (2013.01)

(58) Field of Classification Search
CPC ............. G06F 13/1668; G06F 13/4282; G06F 2213/0026
See application file for complete search history.

(56) References Cited

U.S. PATENT DOCUMENTS 7,631,128 B1 * 12/2009 Sgrosso ................ H04L 49/557
710/36
2007/0130407 A1   6/2007 Olson et al.
(Continued)

FOREIGN PATENT DOCUMENTS

CN   105975427   9/2016
CN   106575206   4/2017
(Continued)

OTHER PUBLICATIONS

International Preliminary Report on Patentability in International Appln. No. PCT/US2009/042061, dated Apr. 1, 2021, 6 pages.
(Continued)

*Primary Examiner* — Henry Tsai
*Assistant Examiner* — Harry Z Wang
(74) *Attorney, Agent, or Firm* — Fish & Richardson P.C.

(57) ABSTRACT

A standalone Storage Controller with PCIe Multi-Mode capability that can be configured as PCIe Root-Complex (RC), an End-Point (EP) or a bridge (BR). In EP mode, the Storage Controller acts like a regular PCIe slaved controller which is connected to a PCIe Root-Complex provided by a Host via a PCIe port. While in RC mode, the Storage Controller acts as a PCIe configuration and management entity, a Host acting as a PCIe Root-Complex, which an add-in card or chip can attach to via a PCIe port that is provided by the Storage Controller, supporting any type of Network Device Interface, without an external Root-Complex. While in bridge mode, the Storage Controller can act as a transparent or non-transparent bridge with either a (Continued)

Root-Complex or End-Point port for the internal connection to the bridge.

9 Claims, 4 Drawing Sheets

(56) References Cited

U.S. PATENT DOCUMENTS

| | | |
|---|---|---|
| 2007/0266179 A1 | 11/2007 | Chavan et al. |
| 2014/0281040 A1* | 9/2014 | Liu .................. G06F 13/16 |
| | | 710/3 |
| 2015/0074320 A1 | 3/2015 | Galles et al. |
| 2015/0304423 A1 | 10/2015 | Satoyama et al. |
| 2016/0162189 A1* | 6/2016 | Malwankar ........... G06F 3/0661 |
| | | 711/170 |
| 2016/0313943 A1* | 10/2016 | Hashimoto ........... G06F 3/0608 |
| 2018/0024743 A1* | 1/2018 | Herman ................ G06F 3/0604 |
| | | 710/316 |
| 2018/0129623 A1 | 5/2018 | Klacar et al. |
| 2019/0065433 A1* | 2/2019 | Voigt .................. G06F 11/1004 |

FOREIGN PATENT DOCUMENTS

| | | |
|---|---|---|
| CN | 107820693 | 11/2020 |
| TW | 200925880 | 6/2009 |

OTHER PUBLICATIONS

International Search Report and Written Opinion in International Appln. No. PCT/CN2019/107015, dated Dec. 25, 2019, 7 pages.

* cited by examiner

SYSTEMS, METHODS AND APPARATUS FOR A STORAGE CONTROLLER WITH MULTI-MODE PCIE FUNCTIONALITIES

CROSS-REFERENCE TO RELATED APPLICATIONS

This application is a national phase entry under 35 U.S.C. 371 of PCT Application Serial No. PCT/CN2019/107015, filed Sep. 20, 2019, which claims priority to CN Patent Application Serial No. 201811108121.2, filed Sep. 21, 2018. The entirety of each of the foregoing is incorporated by reference.

FIELD OF THE INVENTION

A unique Storage Controller with Multi-Mode PCIe functionally, that can be configured as either a PCIe Root-Complex (RC), a PCIe End-Point (EP) or a bridging function (BR).

DESCRIPTION OF THE RELATED ART

A Storage Controller, a device supporting the Peripheral Component Interface Express (PCIe) interface, traditionally provides only PCIe End-Point functionally. PCIe devices need to connect to a PCIe Root-Complex directly, or through one or more PCIe switches, in order to be configured and managed.

The Root-Complex scans the PCIe bus during enumeration in order to identify and configure the device attached to that bus, for example a Non-volatile Memory Express (NVMe) Mass Storage Controller in this case. The system BIOS/OS will then load the proper driver, and the storage controller is ready for operation. During this mode, the storage controller is a slave device, connected to one single host in single port case.

For a Storage Controller to communicate with an external remote host over a switched network, prior solutions always require a local host, external to the Storage Controller (e.g., Intel Xeon), to first receive and terminate the network traffic (e.g., NVME over Remote Direct Memory Access or RDMA), and then the local host will relay the command and data to a Storage Controller. The relay of data is typically one of the performance bottlenecks, given the high bandwidth of the data path, e.g., greater than 100 Gb/s. Other proposed solutions, which can terminate the network traffic in a smart Network Interface Controller (e.g. a Marvell 88SN2400 converter controller), which includes a Root-Complex, have drawbacks with this approach driving the requirement of a specialized network interface chip (NIC) or plug-in card.

Standard configurations using traditional architectures with a Central Processing Unit (CPU) providing the Root-Complex functionality in today's Just A Bunch of Flash Array (JBOF) architectures can't keep up with the current performance demands, and certainly not with the future growth of SSD performance. A high performance SSD today can supply bandwidth of 32 Gb/s from the storage interface, which would require a by 4 interface of PCIe generation 3 connectivity per SSD. A JBOF with 32 drives would require over 700 lanes of PCIe in order to provide adequate multi-path connectivity. This requires a large number of PCIe switches to be used in order to meet this demand, which is very costly in dollars, printed circuit board (PCB) real estate and power.

It would be desirable to create a higher performance communications path between the SSD and the external entities.

BRIEF SUMMARY OF THE INVENTION

The present invention provides an innovative, convenient and cost effective method of use when creating high performance Storage Controllers. The invention enables the use with a standard NIC, either single network port or dual or multiple network ports. The invention eliminates the data and command relays without adding significant hardware/firmware resources in the storage controller.

In one embodiment of the present invention, a Storage Controller is configured such that the need for an additional processing unit, a Root-Complex, is completely alleviated, making the design much more cost effective and power efficient.

BRIEF DESCRIPTION OF THE DRAWINGS

The drawings illustrate only exemplary embodiments of the invention and therefore do not limit its scope because the inventive concepts lend themselves to other equally effective embodiments.

DETAILED DESCRIPTION OF THE INVENTION

Figure 1:
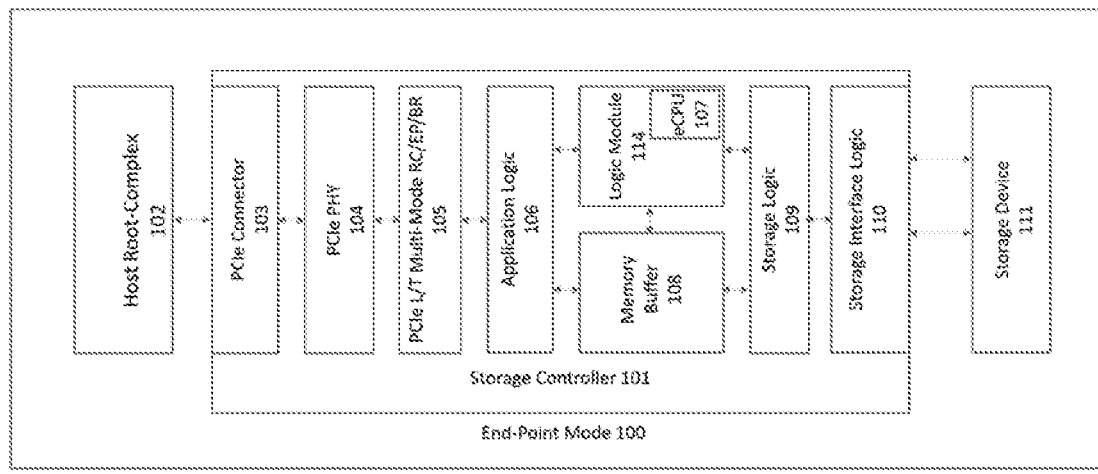
FIG. 1 embodies the End-Point Mode, a more standard method of connecting a Storage Controller into an existing system. The Storage Controller can attach to the Hosts Root-Complex via a PCIe interface. The Storage Controller can then be found and configured by the Host processing complex. Multiple Storage Controllers can be attached to the compute complex at any time, but there can only be one Host base Root-Complex.

The drawings illustrate only exemplary embodiments of the invention and therefore do not limit its scope because the inventive concepts lend themselves to other equally effective embodiments. FIG. 1 shows standalone Storage Controller 101 configured in End-Point mode 100 that is comprised of one or more of the following functional elements PCIe Connector 103, PCIe PHY 104, PCIe L/T Multi-Mode RC/EP/BR 105, Logic Module 114, that may contain an embedded central processing unit (eCPU) 107, Application Logic 106, Memory Buffer 108, Storage Logic 109, Storage Interface Logic 110, Host PCIe Root Complex 102, and Storage Device 111. PCIe L/T Multi-Mode RC/EP/BR 105, configured in End-Point mode, is the PCIe controller handling the link and transport layers of the PCIe protocol. The Application logic 106 handles protocol command processing logic. The Memory Buffer 108 may consist of static random access memory (SRAM) and/or dynamic random access memory (DRAM) to buffer the data and command traffic between Application logic 106 and the storage logic 109 and storage interface logic 110. The Storage Interface Logic 110 handles the interface between the Storage Controller and Storage Device 111. The Storage Device 111 is configured and managed by the Storage Controller 101. The Storage Device 111 is connected directly to the Storage Controller 101 using the Storage Interface Logic 110. The Storage Controller could then be one or more plug-in PCIe printed circuit board (PCB) cards, or a System on a Chip (SOC) located within a storage system, also known as a target. (The Host connection could be found locally, within the target as a CPU complex with a PCIe Root-Complex, or externally, with the use of a PCIe fabric connection). An external host could be comprised of one or more of the following; a server, or any device that contains a PCIe root complex. In one embodiment, the Storage Controller 101 acts as NVMe target, the application logic 106 handles the NVMe command protocol and data processing functions, and may be assisted by the Logic Module 114 or the embedded processor subsystem complex eCPU 107.

Figure 2:
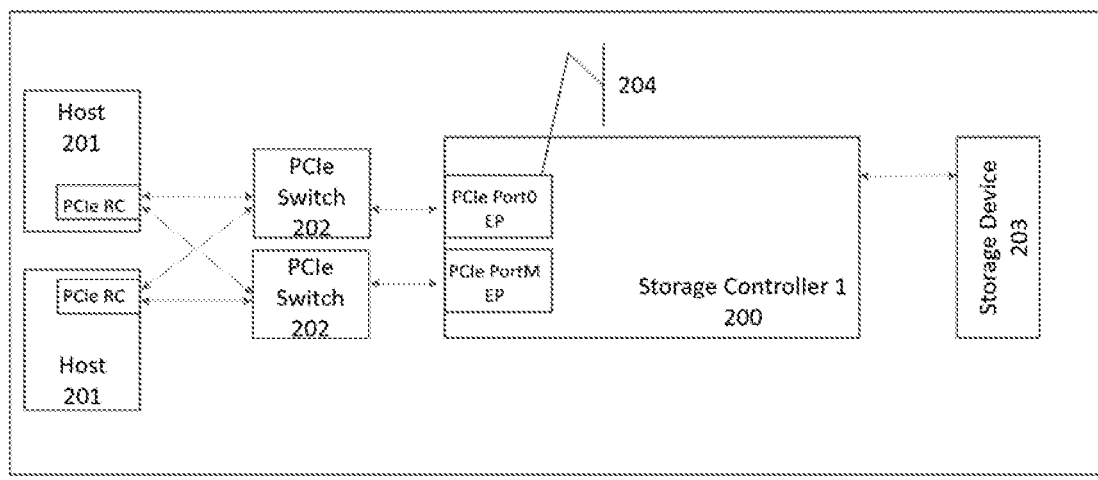
FIG. 2 embodies a Storage Controller working in a PCIe dual ported (slave) End-Point mode configuration. The Storage Controller is providing Transparent I/O Expansion to the two Hosts, each configured as a separate Root-Complex, each being attached to the Storage Controller through an external PCIe switch. The Storage Controller can have 1 to "M" PCIe Ports associated with it.

FIG. 2 embodies a Storage Controller 200 that is located within a target and provides connectivity to a Storage Device 203. The Storage Controller 200 and the Storage Device 203 use a common interface to communicate. A Storage Controller 200 is used in this mode to allow a Host 201 direct access and control to storage in a manner that closely resembles a Host using direct attached storage (i.e. storage located within the Host). A Storage Controller 200 located in a target configured in End-Point mode, is using a PCIe Port 204 to connect to a PCIe switch 202. The PCIe switch can be internal or external to the target. The PCIe switch is connected to Hosts 201 that are configured with a PCIe fabric interface that can perform as a PCIe Root-Complex.

A PCIe Port 204 may comprise one or more of the following: a PCIe Connector 103, a PCIe PHY 104 and PCIe L/T Multi-Mode RC/EP/BR 105 logic. The port 204 is configured to operate in End-Point mode. The Storage Controller 200 may comprise two or more PCIe Port 204's. A Host 201 is a computer/server with a network interface, in this embodiment a PCIe interface, which is capable of performing as a PCIe Root-Complex. The Host may have the ability to configure and manage the Storage Controller 200 and Storage Device 203 through the Storage Controller, while the Storage Controller is acting in a Transparent Input/Output (I/O) manner.

Figure 3:
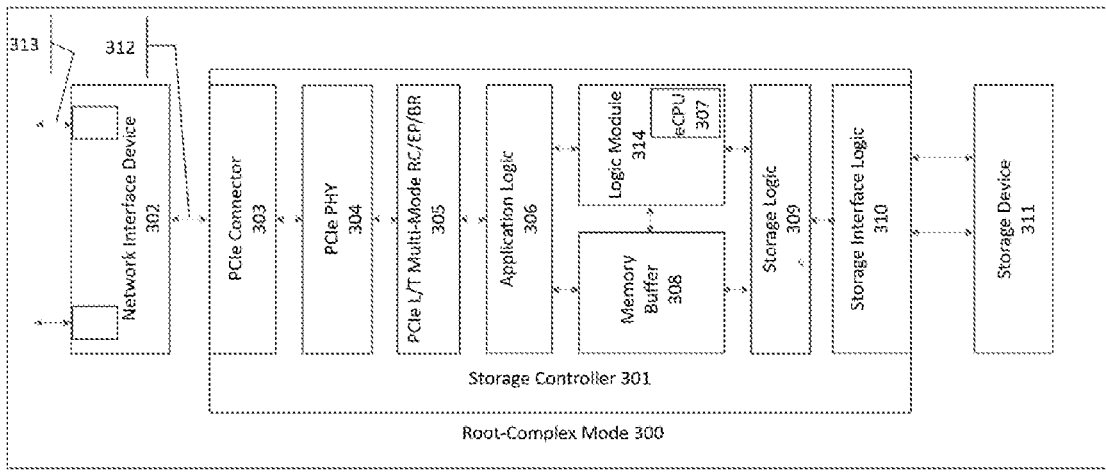
FIG. 3 embodies the Root-Complex mode, where the Storage Controller is configured as a standalone PCIe Root-Complex. In this mode the Storage Controller can connect and control PCIe slave device(s), e.g. networking add-in card or networking chip. The slave device can then support any fabric connectivity (i.e. Ethernet, Fibre Channel, Infiniband, etc.) that is required. While operating in Root-Complex mode, the Storage Controller can independently establish networking connections to a remote initiator or host, without a local Root-Complex external to the Storage Controller. In one embodiment, the Storage Controller acts as an NVMe_oF (NVMe over fabric) target communicating with a remote NVMe initiator over Ethernet.

FIG. 3 shows a Storage Controller 301 when configured in Root-Complex mode 300 that may comprise of one or more of the following functional elements: PCIe Connector 303, PCIe PHY 304, PCIe L/T Multi-Mode RC/EP/BR 305, Logic Module 314, that may contain an eCPU 307, Application Logic 306, Memory Buffer 308, Storage Logic 309, Storage Interface Logic 310. The said functional elements may comprise one or more of the following: hardware multiplexors, hardware registers, hardware state machines, hardware gates. The said functional elements are used to configure and manage a Network Interface device 302 and a Storage Device 311 without the use of an external PCI-e Root-Complex. A Network Interface device 302 that can support network interfaces (e.g. Ethernet, PCIe, Fibre Channel etc.) on one side, and a PCIe slave interface 312 on the other (e.g PCIe plug-in card, SOC). A PCIe Connector 303 is an interface that is compliant to the PCIe standard. This can take the form of a standard connector, edge fingers used with a plug-in card or directly connected through other electrical means (e.g. etch on a PCB).

A PCIe Phy 304 is a physical layer interface that is complaint to the electrical signaling standard for PCIe on the PCI connector side, and utilizes a different internal interface to attach to the PCIe L/T Multi-Mode RC/EP/BR 305 logic. A PCIe L/T Multi-Mode RC/EP/BR 305, configured in Root-Complex mode is the PCIe controller handling the link and transport layers of the PCIe protocol. An Application Logic 306 handles the application layers of the network protocols and the storage protocols (carried over the network protocols). A Logic Module 314 element may comprise one or more of the following: hardware multiplexors, hardware registers, hardware state machines, hardware gates, embedded CPU. In one embodiment, an eCPU 307 within the Storage Controller 301, running an embedded operating system (OS), providing the programmable flexibility of one or more of, but not limited to the following functions: to configure and manage a PCIe Root-Complex, networking protocol offload assistance, storage protocol offload assistance, configure and manage different Storage Devices. A Memory Buffer 308 consists of SRAM and/or DRAM memories to buffer the data and command traffic between Application logic 306, the storage logic 309 and interfaces. The Storage Logic 309 block handles the control and data processing of the Storage Devices 311. A Storage Device 311 is any non-volatile memory device (i.e. NAND Flash, SSD etc.) that would connect to a Storage Controller 301 via Storage Interface Logic 310.

In one embodiment the Storage Controller 301 may comprise one or more of the following to indicate which mode, either root complex or slave that it should be operating in: writing a value to a settable register, having a hardware pin when connected to either power or ground, an SOC metal mask option, a value read from an SOC Joint Electronic Devices Engineering Council (JEDEC) defined port, a value read in from two or more pins.

In one embodiment, the Storage controller 301 acts as a NVMe over Fabrics (NVMe_oF) target communicating with a remote NVMe_oF initiator over Ethernet, using one of the NVMe_oF protocols (RoCE, iWARP, TCP/IP, FC, etc). Today's Network Interface Device 302 typically offers features to offload common network protocols such as RDMA, and therefore the Logic Module 314 and Application logic 306 can provide assistance. After the RDMA traffic is terminated, Application logic 306 is involved in speeding up the processing of the NVMe commands carried over the RDMA protocol and the associated read and write data processing and interfacing with Storage Logic 309. In one embodiment an eCPU complex 307 is responsible for NVMe administrative commands as well as error handling. It can also be used to perform administrative tasks of the Storage Devices 311. Storage Logic 309 takes care of read and write data flow control and processing.

In another embodiment the eCPU 307 may manage one or more of the following: management of the submission, completion and administrative queue pairs from the NVMe over Fabrics protocol, protocol validation, IO context loading and storing, address validation. The Application Logic 306 can perform hardware assist functions for the NVMe over Fabrics data message to offload the eCPU 307 that may comprise one or more of the following: IO or session context memory fetching, IO or session context state updates, protocol validation, address validation, queue pair pointer updates. The incoming NVMe over Fabrics frame could be partially processed by either the eCPU 307 or the Application Logic 306 and then transferred in part or in whole to the Storage Interface Logic 310 or the Memory buffer 308.

Figure 4:
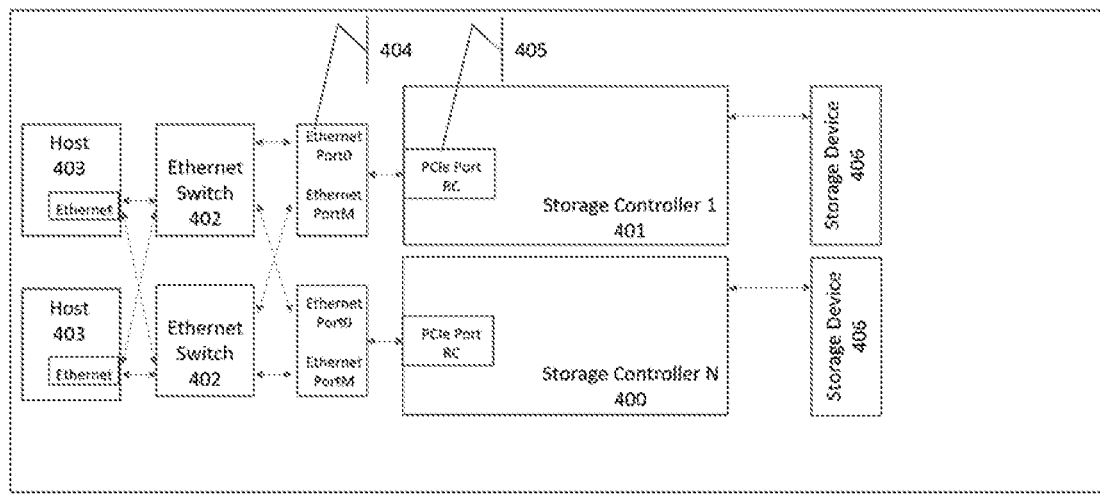
FIG. 4 is a diagram showing how the Storage Controller of FIG. 3 could be applied in a storage target system, using a dual-ported Network Interface Devices to provide a multi-path solution.

FIG. 4 shows two Storage Controllers 400 and 401 configured in Root-Complex mode that is located within a target and provides connectivity to a plethora of Flash Storage Device(s) 406 to a plethora of Host(s) 403 through a number of standard Ethernet Switch(es) 402. The target Ethernet ports 404 are connected to the Ethernet Switch 402 in a fully redundant configuration. The Storage Controller 400 401 is configured to operate in PCIe Root-Complex mode, providing all the configuration and management of the dual-ported Network Interface Device using Ethernet Port 404, through Storage Controllers PCIe Port 405, and the Flash Storage Device 406. The Hosts 403 and Storage Controllers 400 401 are connected in a fully redundant multi-path configuration. Note that only two Storage Controllers are shown 400 401 but the invention can support any number of Storage Controllers.

Figure 5:
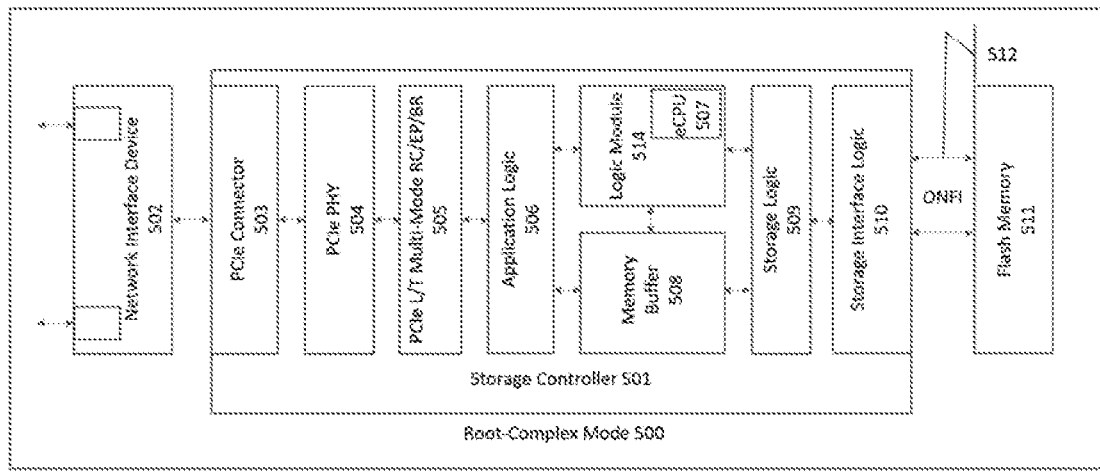
FIG. 5 is a diagram showing the Storage Controller working as a PCIe Root-Complex, and is managing Flash Memory through an Open Nand Flash Interface (ONFI).

FIG. 5 shows a Storage Controller, as described in FIG. 3, with the same mode and internal components, with the exception of the Storage Interface Logic 510 has been changed to reflect the Open NAND Flash Interface (ONFI) that allows more control over the Flash Storage by the Storage Controller, and is directly controlling Flash Memory 511. A Flash Memory 511 is a discreet set of some form or non-volatile memory devices that are directly connected to the Storage Controller through the Storage Interface Logic 510.

Figure 6:
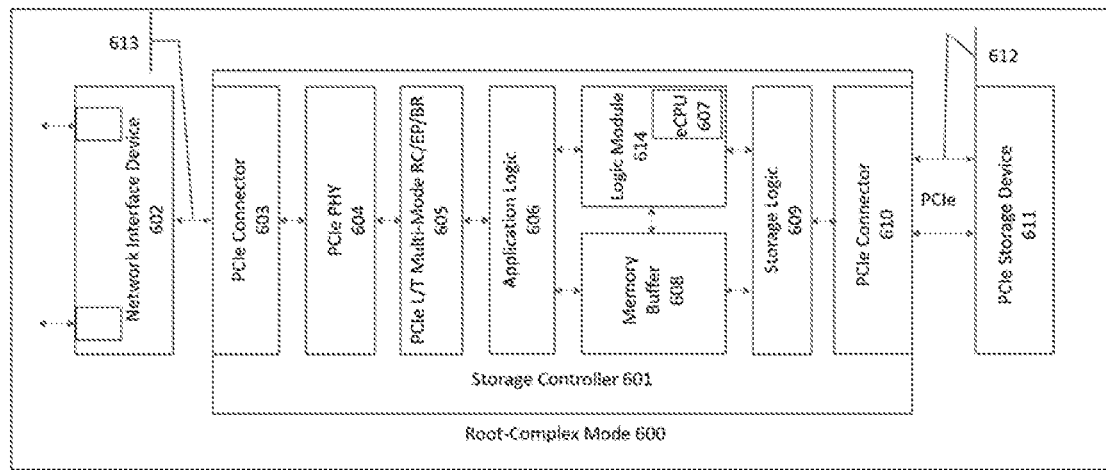
FIG. 6 is a diagram showing the Storage Controller storage interface supporting any PCIe storage device using a standard PCIe interface.

FIG. 6 shows a Storage Controller 601, as describe in FIG. 3 with the same mode and internal components, with the exception of the Storage Interface Logic has been changed to a PCIe Connector 610 by the Storage Controller, and is directly controlling PCIe Storage Device 611 over standard PCIe signaling 612. A PCIe Storage Device 611 is a standard PCIe SSD device that connects to the Storage Controller 601 PCIe Connector 610 through a PCIe interface 612, and is configured and managed by the Storage Controller 601. A Network Interface Device 602 is additionally connected to a PCIe Connector 603 via a PCIe interface 613.

Figure 7:
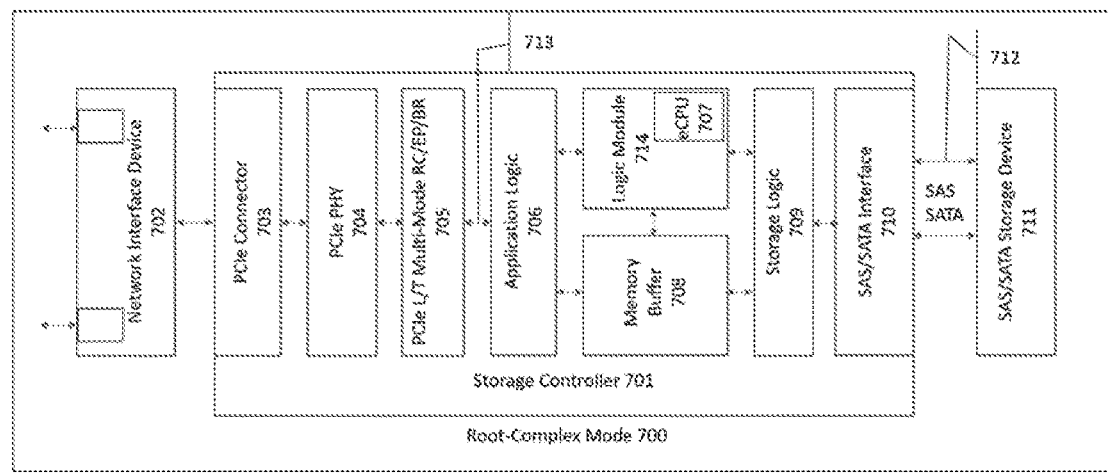
FIG. 7 is a diagram showing the Storage Controller working as a PCIe Root-Complex. In this mode, the Storage Controller is responsible for configuring and operating the locally PCIe attached Ethernet device. Each of the Storage Controller Ethernet ports is attached to an Ethernet switch in a fully redundant configuration. The Storage Controller can have 1 to "N" Storage Controllers, each with 1 to "M" PCIe Ports associated with it.

FIG. 7 shows a Storage Controller 701, as describe in FIG. 3 with the same mode and internal components, with the exception of the Storage Interface has been changed to a SAS/SATA Interface 710 by the Storage Controller 701, and is directly controlling a SAS/SATA Storage Device 711 as connected through a SAS/SATA interface 712.

Figure 8:
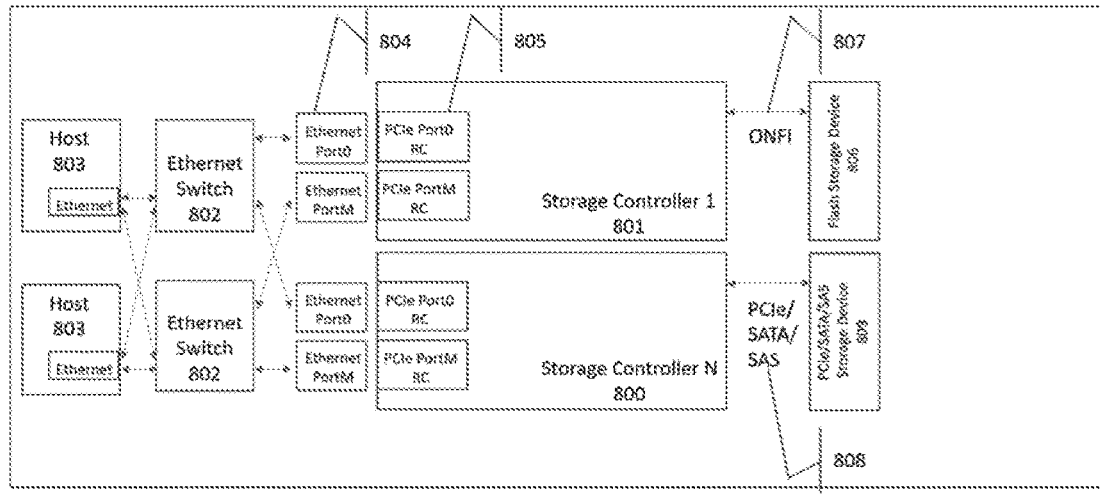
FIG. 8 is a diagram showing "N" Storage Controllers, each configured and supporting a different storage interface.

FIG. 8 shows two Storage Controllers 800 and 801 configured in Root-Complex mode that is located within a target and provides connectivity to a plethora of Flash Storage Device 806 over a ONFI 807 and PCIe/SATA/SAS storage device 809 over a PCIe/SATA/SAS interface 808 to a plethora of Hosts 803 through a number of standard Ethernet Switches 802. The target Ethernet ports 804 are connected to the Ethernet Switch 802 in a fully redundant configuration. The Storage Controller is configured to operate in PCIe Root-Complex mode, providing all the configuration and management of the Ethernet Port 804 through one of the Storage Controllers PCIe Port 805 and the Flash Storage Device 806. The Hosts 803 and Storage Controllers 800 801 are connected in a fully redundant multi-path configuration. Note that only two Storage Controllers are shown 800 801 but the invention can support any number of Storage Controllers.

A Flash Storage Device 806, in this embodiment, is a self contained device that utilizes some form of non-volatile memory and is managed by an on-board controller. This controller also is using an ONFI that allows more control over the Flash Storage Device 806 by the Storage Controller 800 801. An Ethernet Port 804 in this embodiment is a stand-alone SOC type device that utilizes both a single Ethernet interface for external fabric connectivity and an internal PCIe interface for internal connectivity with the Storage Controller PCIe Port 805. The external network connectivity can also be any other type of network transport (e.g. Infiniband or Fibre Channel) that can be provided as a SOC or plug-in card, both which is design dependent.

An Ethernet Switch 802 can be an internal or external device that provides the network connectivity to a plethora of Hosts 803. A Host 803 is computer/server with a network interface, in this embodiment an Ethernet interface that used standard Ethernet network components to attach to external switch and storage elements.

Figure 9:
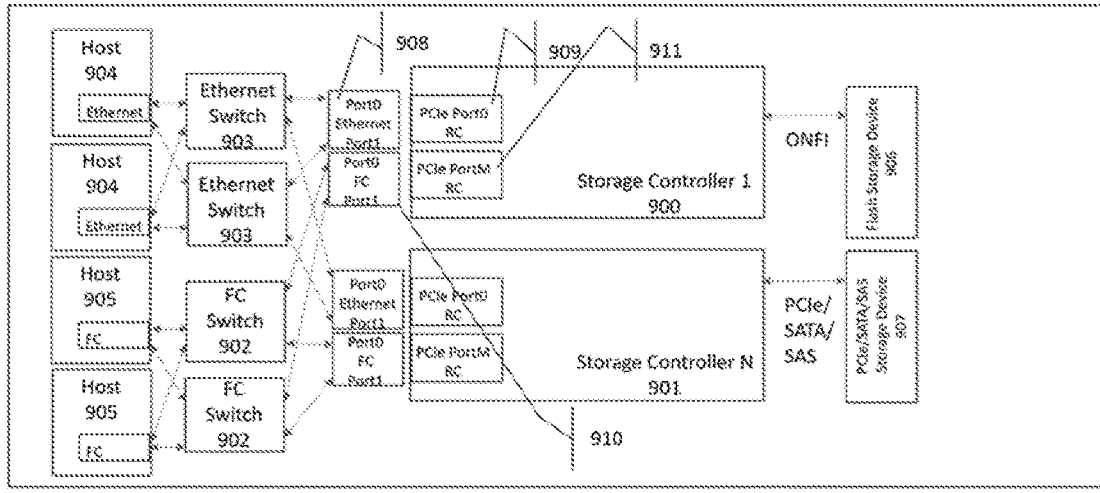
FIG. 9 is a diagram showing that multiple Storage Controller's employed, each are configured and support a different storage interface, with different storage devices attached. The Storage Controller is also managing two different fabric interface devices each supporting two ports; one PCIe Ethernet device and one PCIe Fibre Channel (FC) device. Each fabric is connected in a fully redundant configuration to a plethora of Hosts, each supporting a plethora of fabric interfaces.

FIG. 9 shows two Storage Controllers 900 901 that are configured just as in FIG. 7 but the network interface of Storage Controller PCIe Port 911 909 are connected to Network Device 910 and 908 that provide network connectivity to a Fibre Channel and Ethernet network respectively. Each of these network devices are dual ported, providing a redundant fabric topology. Note that any number of Storage Controllers 900 901 can be supported. A dual ported Fibre Channel Controller 910 is a device (i.e. a plug-in card, or SOC) that provides two Fibre Channel interfaces externally from the Storage Controller 900, and a PCIe interface internally to the Storage Controller PCIe Port 911. A dual ported Ethernet Network Controller 908 is a device (i.e. a plug-in card, or SOC) that provides two network interfaces externally to the Storage Controller 900, and a PCIe interface internally to the Storage Controller PCIe Port 909.

Figure 10:
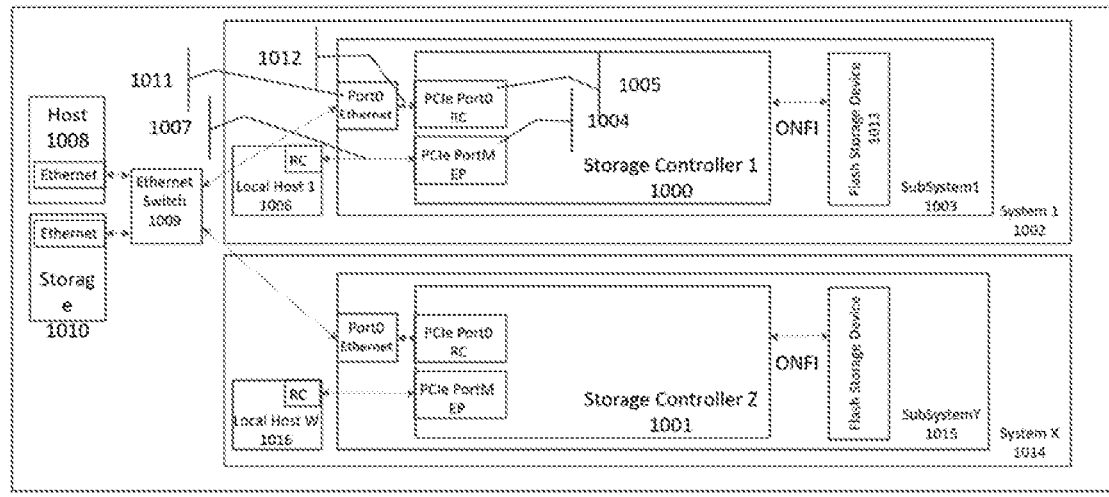
FIG. 10 is a diagram showing how the Storage Controller can independently configure and control its PCIe ports, with each having the ability to be either an End-Point or Root-Complex. It further shows how this capability can be used.

FIG. 10 shows System 1 1002 and System X 1014. The current invention can support any number of Systems 1002 1014. These systems can be any type of system where a Local Host 1 1006 is co-located with a storage device in an enclosed environment. In this embodiment, Local Host 1 1006 and subsystem1 1003 are co-located in System 1 1002 and Local Host W 1016 and subsystemY 1015 are co-located in System X 1014. The subsystems 1003 1015 may comprise one or more of the following blocks: flash storage device 1013, storage controller 1000, PCIe Port0 RC 1005, PCIe PortM EP 1004, Port0 Ethernet 1011. The subsystem blocks may comprise: a single PCB, one or more PCBs, a single physical enclosure, one or more physical enclosures. The Storage Controller 1 1000 and Storage Controller Z 1001 each have two PCIe ports, with each port's mode being independently configured; with PCIe Port0 1005 being configured in Root-Complex mode, and PCIe PortM 1004 being configured in End-Point mode. PCIe PortM 1004 is connected to Local Host 1 1006 though a PCIe interface 1007, with Local Host 1 having a Root-Complex, which acts as a master device to the PCIe PortM 1004 acting as a slave. PCIe Port0 1005, being configured as a Root-Complex, is connected to a slave Network Interface Device, Port0 Ethernet 1011 over a PCIe interface 1012. The network interface device 1011 is then configured and controlled by Storage Controller 1 1001. The Network Interface Device 1011, in this embodiment, is connected to an Ethernet Switch 1009. Also connected to this Ethernet Switch 1009 are other systems, which can include remote Host 1008, and additional Storage 1010, such as a JBOF.

With PCIe PortM 1004 acting as an End-Point, Local Host 1 1006 terminates its connection at PCIe PortM and is only allowed access to the memory space beyond PCIe PortM 1004 interface as configured through Storage Controller 1 1000. Storage Controller 1 1000 is then bridging between the Local Host 1 1006 and the network beyond the Network Interface Device 1011, though this configuration. In one embodiment, System 1 1002 could be a server running as a Hyper-Converged-Infrastructure (HCI) system, using some HCl software, such as Ceph (object storage open source software). The server would have a local storage device attached over a PCIe interface, such as SSD1 1003, connected internally to the server's compute complex, Local Host 1 1006. Storage Controller 1 1000 PCIe Port0 1005 has connected to additional external Storage 1010 through the Network Interface Device 1011 and the Ethernet Switch 1009 over an Ethernet transport, using any number of protocols (NVMe_oF, iSCSI, etc), providing additional storage space to Local Host 1 1006. When Local Host 1 1006 requests specific storage data, the Storage Controller 1 1000 would then determine if the data is found locally, in the Flash Storage Device 1013, or remotely, in external Storage 1010, and would perform the requested function.

Figure 11:
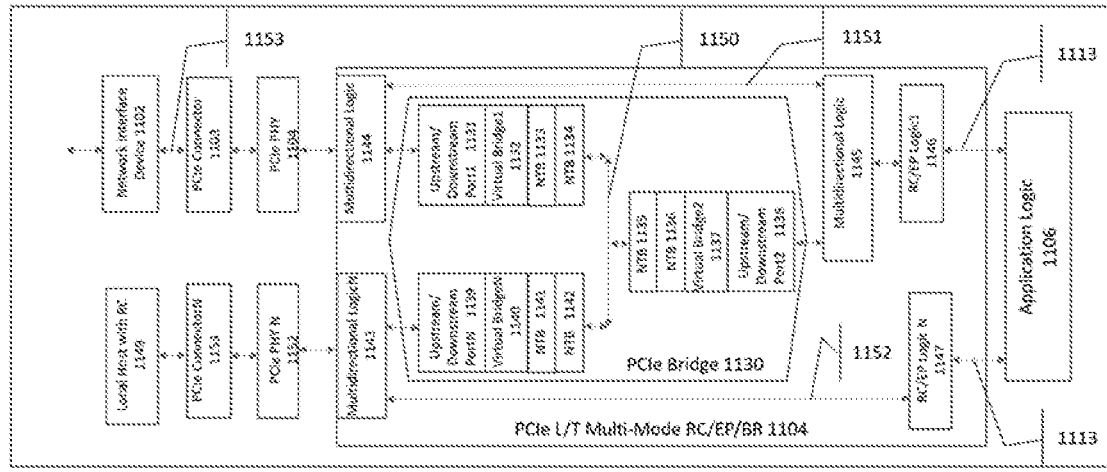
FIG. 11 is a diagram showing and detailed view of the Multi-Mode RC/EP/BR 1104 logic.

FIG. 11 shows the PCIe L/T Multi-Mode RC/EP/BR 1104 in more detail. Inside this block contain a PCIe Bridge 1130, that when configured would create an N port bridge, replacing the RC/EP functionally exported to the PCIe Connector 1103. The PCIe Bridge 1130 is connected to Multi-directional Logic blocks 1143 1144 and 115. Port of the PCIe Bridge contains a Multidirectional Logic Block 1144, an Upstream/Downstream Port1 1131, a Virtual Bridge1 1132, an egress Non-Transparent Bridge (NTB) register 1133 and ingress NTB register 1134. A second port is comprised of Multidirectional Logic 1145, an Upstream/Downstream Port1 1138, a Virtual Bridge1 1137, an egress NTB register 1136 and ingress NTB register 1135. Multidirectional Logic 1144 and Multidirectional Logic 1145 are connected over interface 1151. Multidirectional Logic 1145 also connects to RC/EP Logic 1 1146. The PCIe Bridge 1130 has N ports containing a Multidirectional LogicN 1143, an Upstream/Downstream PortN 1139, a Virtual BridgeN 1140, a egress NTB register 1141 and an ingress NTB register 1142. Virtual Bridge1 1132, Virtual Bridge2 1138 and Virtual BridgeN 1140 are connected over bus 1150. The Multidirectional LogicN 1142 connects to a PCIe PhyN 1152 to an Upstream/Downstream PortN 1139 and to the RC/EP LogicN 1147 over interface 1152. RC/EP Logic1 1146, and any number N of RC/EP LogicN 1147 are connected to the Application Logic 1106 through any number N interface 1113.

NTB registers 1133 1134 1135 1136 1141 1142 are used in pairs (i.e. 1133/1134, 1135/1136, 1141/1142) to translate between a number N separate root complexes, anytime multiple root complexes are present. When a single root complex is present, the use of NTB registers is not needed, and the PCIe Bridge 1130 is acting in transparent mode, providing the Local Host 1149 access to all the Storage Controller's resources, and the management and configuration of the Network Interface Device 1102 over a PCIe interface 1153. In one embodiment, a Local Host with RC 1149 is connected to the Storage Controller through PCIe Connector N 1153. It is a root complex, but the PCIe Bridge 1130 is enabled and configured with Upstream/Downstream Port 1138 to be an upstream port (i.e. a RC is attached), while Upstream/Downstream PortN 1139 is configured to be a downstream port. In this case NTP pair 1141 and 1142 would be used to translate between the two different memory regions, with RC/EP Logic1 being configured into root-complex mode, and providing the configuration and management of the Network Interface Device 1102, and only showing the Local Host 1149 specific areas of the memory space that the Storage Controller manages, which could include on-board Flash memory, and/or external resources connected through a network interface device 1102.

Although the foregoing invention has been described in some detail by way of illustration and example for purposes of clarity and understanding, it may be readily apparent to those of ordinary skill in the art in light of the teachings of this invention that certain changes and modifications may be made thereto without departing from the spirit or scope of the appended claims.

We claim:

1. A Storage Controller system comprising:
   a Network Interface, coupled to a first Host;
   a Flash Memory;
   a Storage Controller, the Storage Controller comprising:
     a first PCIe connector coupled to the Network Interface;
     a second PCIe connector coupled to a second Host;
     a storage interface logic coupled to the Flash Memory;
   a PCIe functional element that supports both End-Point and Root-Complex modes wherein,
     the Flash Memory is coupled to the Storage Controller;
     the Network Interface is coupled to the Storage Controller;
   the first PCIe connector of the Storage Controller, acting as a PCIe master in Root-Complex mode, sends frames from the Flash Memory through the Network Interface to the first host as an initiator, and the first PCIe connector of the Storage Controller, acting as a PCIe slave in End-Point mode, is controlled by the second host as PCIe master, to transfer frames to and from Flash Memory.

2. The system described in claim 1 whereby the network interface is at least one of the following: PCIe bridge, PCIe to Ethernet converter, Ethernet NIC, an InfiniBand NIC, or a Fibre Channel Adapter.

3. The system described in claim 1 whereby the Storage Controller comprises at least one of the following: PCIe connector, PCIe PHY, PCIe L/T Multi-Mode RC/EP/BR, Logic Module that have an eCPU, Application Logic, Memory Buffer, Storage Logic, SAS/SATA Interface, or Storage Interface Logic.

4. The system described in claim 1 whereby the Storage Controller comprises Storage Interface logic connecting the Storage Controller to at least one of the following: Flash Memory, PCIe Storage Device, SAS/SATA or Storage Device.

5. The system described in claim 1 whereby the Storage Controller comprises a logic module, and the logic module comprises at least one of the following: embedded CPU, hardware registers, hardware multiplexors, or hardware RAM blocks.

6. The system in claim 1 whereby the PCIe functional element End-Point and Root-Complex modes is set by at least one of the following methods: a writing a value in a settable register, a value read in from an SOC JEDEC port, or a value read in from two or more pins.

7. The system described in claim 1 whereby the Storage Controller functions as a Root Complex on a first port while simultaneously the Storage Controller functions as an End-Point on a second port.

8. The system described in claim 7 whereby the Storage Controller is comprised of two or more PCIe ports.

9. The system described in claim 7 whereby the Storage Controller comprises an embedded CPU, and the CPU reads one or more of the PCIe frame fields for a received PCIe frame.

\* \* \* \* \*